United States Patent
Polisetty et al.

(10) Patent No.: US 12,506,792 B2
(45) Date of Patent: Dec. 23, 2025

(54) SYSTEM AND METHOD FOR REMOTE INTERVIEW AND ASSESSMENT PROCTORING

(71) Applicants: Karthik Polisetty, Glendale, AZ (US); Kranthi Kumar Polisetty, Glendale, AZ (US); Supraja Garlapati, Glendale, AZ (US)

(72) Inventors: Karthik Polisetty, Glendale, AZ (US); Kranthi Kumar Polisetty, Glendale, AZ (US); Supraja Garlapati, Glendale, AZ (US)

(*) Notice: Subject to any disclaimer, the term of this patent is extended or adjusted under 35 U.S.C. 154(b) by 79 days.

(21) Appl. No.: 18/637,933

(22) Filed: Apr. 17, 2024

(65) Prior Publication Data

US 2025/0238763 A1    Jul. 24, 2025

(30) Foreign Application Priority Data

Jan. 19, 2024   (IN) .............................. 202411003842

(51) Int. Cl.
*G06F 15/16*    (2006.01)
*H04L 65/1069*  (2022.01)

(52) U.S. Cl.
CPC ................ *H04L 65/1069* (2013.01)

(58) Field of Classification Search
None
See application file for complete search history.

(56) References Cited

U.S. PATENT DOCUMENTS

2021/0295725 A1* 9/2021 Jaeh .................... G09B 7/00

* cited by examiner

*Primary Examiner* — Wing F Chan
*Assistant Examiner* — Andrew Woo

(57) ABSTRACT

A system for remote interview and assessment proctoring is disclosed. The system includes a proctoring server configured to identify interviewers and interviewees from among participants of an online meeting based on a role type parameter received from a first user device from which the online meeting is initiated. Further, two different types of meeting links are generated to access the same online meeting. A first type of meeting link is configured to provide exclusive access to a first type of participant identities associated with the identified interviewers. A second type of meeting link is configured to provide exclusive access to a second type of participant identities associated with the identified interviewees. The system selectively controls information flow among participant devices. Specifically, devices linked to interviewers are alerted if anti-proctoring applications are detected on devices associated with interviewees during the online meeting.

11 Claims, 5 Drawing Sheets

SYSTEM AND METHOD FOR REMOTE INTERVIEW AND ASSESSMENT PROCTORING

TECHNICAL FIELD

The present disclosure relates to proctoring of remote interviews and assessments. Moreover, the present disclosure relates to a system and a method for remote interview and assessment proctoring.

BACKGROUND

In the field of remote assessments and interviews, the transition to virtual environments demanded dependable, secure, and fair evaluation processes. However, the remote nature of assessments poses security risks as candidates may exploit the remote nature of the assessment by using external tools or unauthorized resources, affecting the fairness and reliability of evaluations. Conventional approaches lacked robust mechanisms to monitor and deter such cheating or unauthorized activities during remote assessments. This absence of effective proctoring tools within standard video conferencing platforms raised significant concerns about the credibility of remotely conducted evaluations.

Existing solutions may include one or more applications and browsers that utilize approaches like real-time screen monitoring, face detection, and activity analysis for proctoring, yet such approaches fall short in ensuring comprehensive control and secure facilitation of the live remote interviews and assessments. Despite emphasizing monitoring through different proctoring tools, such approaches may not detect all unauthorized activities, potentially missing certain deceitful practices. Such limitations allow for deceptive actions to slip past detection, compromising the evaluation process's integrity. Therefore, despite implementing sophisticated technologies like face detection and activity analysis, these solutions might not fully capture all unauthorized actions, leading to gaps in ensuring a completely secure and controlled environment for remote interviews and assessments.

Therefore, in light of the foregoing discussion, there exists a need to overcome the aforementioned drawbacks.

SUMMARY

The present disclosure provides a system and a method for remote interview and assessment proctoring. The present disclosure provides a solution to the technical problem of how to ensure the integrity and security of live remote interviews and assessments in virtual environments. An aim of the present disclosure is to provide a solution that overcomes at least partially the problems encountered in the prior art and provide an improved system that effectively monitors and prevents cheating or unauthorized activities during remote sessions. Additionally, it aims to introduce an improved method that establishes robust proctoring mechanisms, ensuring the reliability, fairness, and equity of evaluations conducted remotely while mitigating technological vulnerabilities that compromise the assessment process.

One or more objectives of the present disclosure is achieved by the solutions provided in the enclosed independent claims. Advantageous implementations of the present disclosure are further defined in the dependent claims.

In one aspect, the present disclosure provides the system for remote interview and assessment proctoring. The system comprises a proctoring server configured to identify one or more interviewers and one or more interviewees from among a plurality of participants of an online meeting based on a role type parameter received from a first user device from which the online meeting is initiated. The proctoring server is further configured to generate two different types of meeting links to access the same online meeting. A first type of meeting link of the two different types of meeting links is configured to provide exclusive access to a first type of participant identities (IDs) associated with the identified one or more interviewers. A second type of meeting link of the two different types of meeting links is configured to provide exclusive access to a second type of participant identities (IDs) associated with the identified one or more interviewees. The proctoring server is further configured to control information flow selectively among a plurality of user devices of the plurality of participants such that one or more first type of user devices associated with the first type of participant IDs are alerted of a list of anti-proctoring applications being operational at one or more second type of user devices associated with the second type of participant IDs during the online meeting.

The system of the present disclosure includes the proctoring server that has ability to identify the one or more interviewers and the one or more interviewees based on role type parameters, ensuring precise categorization of participants and laying the foundation for a controlled and organized online meeting environment. The generation of two different types of meeting links, each providing exclusive access to specific participant identities, enhances security and privacy, preventing unauthorized access to sensitive information. Moreover, the selective control of information flow adds a layer of vigilance, enabling the proctoring server to alert interviewers about the operational status of anti-proctoring applications on interviewees' devices. The real-time awareness empowers the interviewers to address potential breaches promptly, ensuring the integrity of the assessment process. The ability to address the potential breaches promptly encompasses precise participant identification, enhanced security through exclusive meeting links, and proactive monitoring of anti-proctoring applications, collectively contributing to a robust and trustworthy remote interview and assessment proctoring system.

It is to be appreciated that all the aforementioned implementation forms can be combined. All steps which are performed by the various entities described in the present application as well as the functionalities described to be performed by the various entities are intended to mean that the respective entity is adapted to or configured to perform the respective steps and functionalities. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

Figure 1:
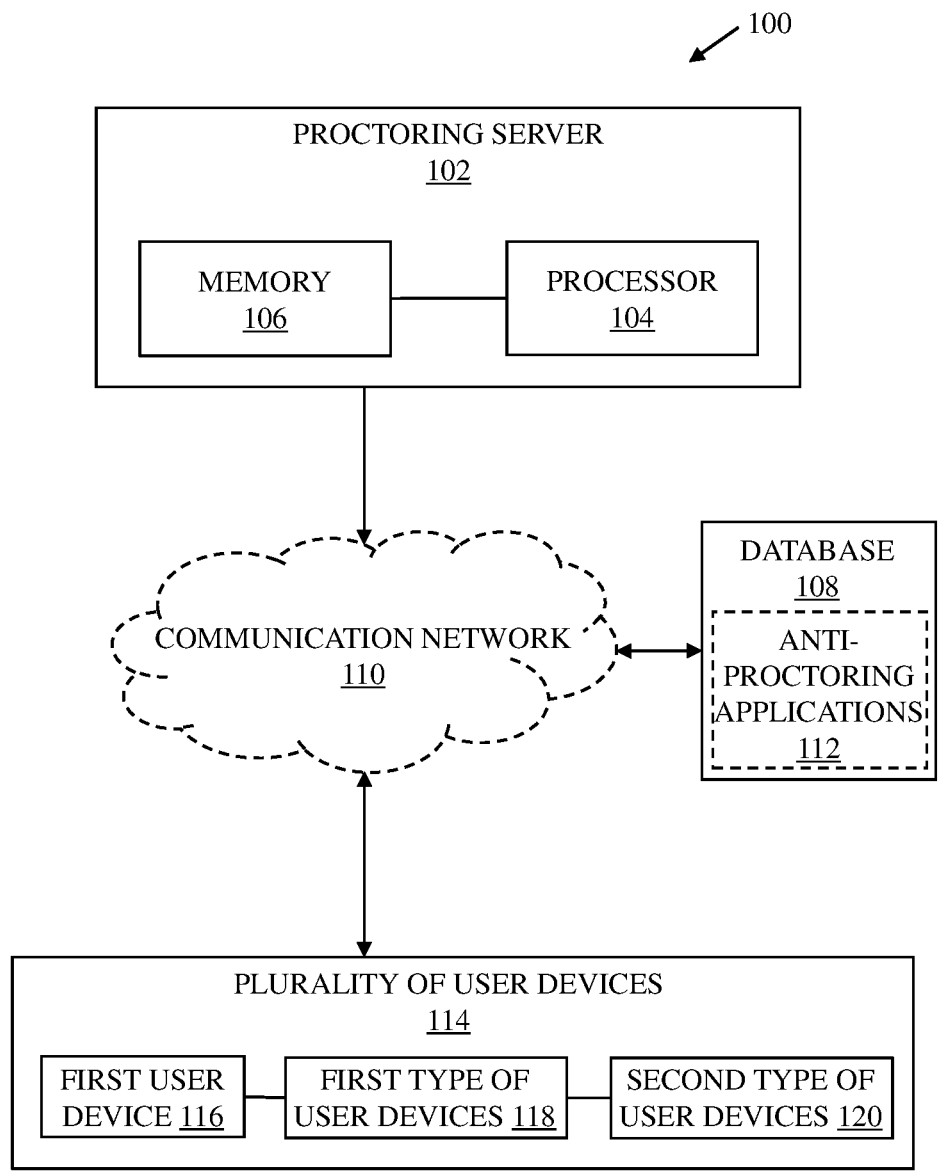
FIG. 1 is a block diagram of a system for remote interview and assessment proctoring, in accordance with an embodiment of the present disclosure.

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

FIG. 1 is a block diagram of a system for remote interview and assessment proctoring, in accordance with an embodiment of the present disclosure. With reference to FIG. 1, there is shown a block diagram of a system 100 for remote interview and assessment proctoring. The system 100 includes a proctoring server 102 (interchangeably referred to as the server 102), a processor 104, and a memory 106 communicably coupled to the processor 104. The server 102 includes the processor 104 and the memory 106. In an implementation, the processor 104 and the memory 106 may be implemented on the server 102.

In some implementations, the system 100 further includes a predefined database 108 communicably coupled to the server 102 via a communication network 110. The predefined database 108 includes anti-proctoring applications 112. The server 102 may be communicably coupled to a plurality of user devices 114, such as a first user device 116, a first type of user devices 118, and a second type of user devices 120, via the communication network 110. In some implementations, the first user device 116 is one of the first type of user devices 118. In some other implementations, the first user device 116 is one of the second type of user devices 120. Each of the first user device 116, the first type of user devices 118, and the second type of user devices 120 is communicatively connected to each other. Further, each of the first user device 116, the first type of user devices 118, and the second type of user devices 120 includes a user interface.

The present disclosure provides the system 100 for remote interview and assessment proctoring, where the system 100 identifies interviewers and interviewees within an online meeting, creates distinct meeting links for them, and manages the flow of information among participant devices. Specifically, the system 100 discerns between the interviewers and the interviewees based on their roles in the meeting's initiation device, i.e., the first user device 116. The system 100 further generates two types of meeting links, each offering exclusive access to different participant identities: one for the interviewers and another for the interviewees. Additionally, the system 100 exercises control over information flow among participant devices, enabling the identification and alerting of anti-proctoring applications operating on the interviewee devices to the corresponding interviewer devices during the online meeting.

The proctoring server (the server) 102 includes suitable logic, circuitry, interfaces, and code that may be configured to communicate with the plurality of user devices 114 via the communication network 110. In an implementation, the server 102 may be a master server or a master machine that is part of a data center that controls an array of other cloud servers communicatively coupled to it for load balancing, running customized applications, and efficient data management. Examples of the server 102 may include, but are not limited to, a cloud server, an application server, a data server, or an electronic data processing device.

The processor 104 refers to a computational element that is operable to respond to and processes instructions that drive the system 100. The processor 104 may refer to one or more individual processors, processing devices, and various elements associated with a processing device that may be shared by other processing devices. Additionally, the one or more individual processors, processing devices, and elements are arranged in various architectures for responding to and processing the instructions that drive the system 100. In some implementations, the processor 104 may be an independent unit and may be located outside the server 102 of the system 100. Examples of the processor 104 may include, but are not limited to, a hardware processor, a digital signal processor (DSP), a microprocessor, a microprocessor, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

The memory 106 refers to a volatile or persistent medium, such as an electrical circuit, magnetic disk, virtual memory, or optical disk, in which a computer can store data or software for any duration. Optionally, the memory 106 is a non-volatile mass storage, such as a physical storage media. A single memory may encompass and, in a scenario, where the system 100 is distributed, the processor 104, the memory 106 and/or storage capability may be distributed as well. Examples of implementation of the memory 106 may include but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The predefined database 108 refers to a database that is established beforehand and contains information relevant to authorized services or functionalities. The predefined database 108 is likely utilized for cross-referencing and comparison with the active services detected during the interview or assessment process to determine their legitimacy. The predefined database 108 includes one or more anti-proctoring applications 112 that are software tools or programs configured to circumvent or evade the monitoring and proctoring mechanisms employed during online assessments or interviews. The one or more anti-proctoring applications 112 aim to prevent or interfere with the detection of unauthorized activities by the system 100. Some examples of the one or more anti-proctoring applications 112 may include various features such as screen masking, screen mirroring prevention, keyboard shortcuts to quickly minimize screens, or functionalities that alert users when proctoring tools are active or attempting to monitor their activities. The one or more anti-proctoring applications 112 are used by individuals seeking to cheat or engage in unauthorized behaviour during monitored online sessions.

The communication network 110 includes a medium (e.g., a communication channel) through which the plurality of user devices 114 communicates with the server 102. The communication network 110 may be a wired or wireless communication network. Examples of the communication network 110 may include, but are not limited to, Internet, a Local Area Network (LAN), a wireless personal area network (WPAN), a Wireless Local Area Network (WLAN), a wireless wide area network (WWAN), a cloud network, a Long-Term Evolution (LTE) network, a plain old telephone service (POTS), a Metropolitan Area Network (MAN), and/or the Internet.

Each of the plurality of user devices 114 refers to the numerous computing devices utilized by the participants involved in the online meeting or assessment. Each of the plurality of user devices 114 may encompass computers, laptops, tablets, or smartphones employed by interviewers, interviewees, or any other individuals engaged in the online session. The term denotes the diverse array of technological platforms used by the participants to access the shared virtual space where the online meeting or assessment occurs. The plurality of user devices 114 includes the first user device 116, that refers to an initial computing equipment or gadget used to initiate the online meeting or assessment. The first user device 116 may be a computer, laptop, tablet, or smartphone wielded by a participant, perhaps an interviewer or an individual assigned a particular role, who commences the online meeting and serves as the point of origin for establishing the online meeting. The plurality of user devices 114 further includes the first type of user devices 118 that refers to a specific category or group of devices among the various user devices involved in the online meeting or assessment. The first type of user devices 114 belongs to a particular set of participants, such as interviewers or individuals designated with a specific role of interviewer, and are associated with distinct functionalities or permissions within the system 100. The plurality of user devices 114 further includes the second type of user devices 120, which refers to another distinct category or group of devices among the user devices engaged in the online meeting or assessment. The second type of user devices 120 are often associated with a different set of participants, such as interviewees or individuals assigned a specific role of interviewees, and may possess unique functionalities or permissions within the system 100 that distinguish them from the first type of user devices 118.

In operation, the proctoring server 102 is configured to identify the one or more interviewers and the one or more interviewees from among the plurality of participants of an online meeting based on a role type parameter received from the first user device 116 from which the online meeting is initiated. The proctoring server 102 identifies the one or more interviewers and the one or more interviewees by leveraging the role type parameter received from the first user device 116 initiating the online meeting. This role type parameter acts as a distinguishing factor, enabling the system 100 to differentiate between various participants based on their designated roles in the online meeting. For example, an interview may involve individuals playing different roles, such as interviewers and interviewees. When the online meeting is initiated from the first user device 116, the first user device 116 sends a role type parameter that helps the proctoring server 102 categorize participants accordingly. The role type parameter is sent based on the information provided by a user or as predetermined by a configuration of the system 100. The information may be inputted by the user when initiating the online meeting or may be predefined within the system 100. The provided information may act as a directive that informs the proctoring server 102 about the specific roles each participant may assume during the online meeting or assessment. Specifically, this allows the system 100 to understand who assumes the role of an interviewer and who holds the role of an interviewee, facilitating the tailored allocation of meeting links and controlled information flow, ensuring distinct access based on the identified roles.

The proctoring server 102 is further configured to generate two different types of meeting links to access the same online meeting. A first type of meeting link of the two different types of meeting links is configured to provide exclusive access to a first type of participant identities (IDs) associated with the identified one or more interviewers. In other words, the first type of meeting links is specifically tailored to grant exclusive access to individuals identified as the interviewers. The first type of meeting links are uniquely associated with their participant identities (IDs), ensuring that only authorized interviewers may access the online meeting through the first type of meeting link. Further, a second type of meeting link of the two different types of meeting links is configured to provide exclusive access to a second type of participant identities (IDs) associated with the identified one or more interviewees. In other words, the second type of link is dedicated to providing exclusive access to individuals identified as the interviewees. The second type of link is configured to allow access only to those participant identities associated with the interviewees, ensuring that the interviewees may join the online meeting through the second type of meeting link but without allowing access to information that is allowed to the first type of participant identities (IDs), i.e., the identified one or more interviewers. By assigning separate links for the interviewers and the interviewees, the proctoring server 102 may maintain the integrity and security of the online meeting. This separation allows distinct access privileges for each group, enabling a controlled environment where the interviewers and the interviewees may engage without interference or access from unauthorized participants. The configuration of the system 100 ensures that the designated links are shared only with their respective participant groups, thus restricting access to the online meeting based on the roles of the one or more interviewers and the one or more interviewees.

In some implementations, the proctoring server 102 utilizes a singular meeting link for both the one or more interviewers and the one or more interviewees. However, the identification of roles (interviewer or interviewee) occurs during a process of adding users to their respective fields within a user interface of the first user device 116. Specifically, the role type parameter is received from the first user device 116 when a user input is provided on the UI rendered on the first user device 116. The UI includes a first role type data field to invite the one or more interviewers and a second role type data field to invite the one or more interviewees for the online meeting. More specifically, an organizer of the online meeting populates the first role type data field with names of one or more interviewers and the second role type data field with names of the one or more interviewees. This division of participant names into distinct fields within the user interface of the first user device 116 aids in the identification and allocation of roles within the online meeting. This role assignment process, performed within the user interface of the first user device 116, serves as a means of segregating participant access and privileges. This approach allows for a unified access point to the online meeting while efficiently distinguishing between the one or more interviewers and the one or more interviewees based on the roles designated to them. Consequently, this approach facilitates controlled and secured participation within the meeting environment, ensuring that each participant accesses functionalities and data in line with their designated role. In some other implementations, the roles are assigned by default when the invite is sent. For example, a default role assigned to the user (also an organizer of the online meeting) of the first user device 116 is set as an interviewer and a default role assigned to other users of the plurality of user devices 114 except the first user device 116 is set as an interviewee. In some other examples, the default role is assigned to an organizing entity or organization overseeing the online meeting. The organization entity or organization may assume a specific role (e.g., interviewer, interviewee) by default, streamlining the management of the online meeting. In such example, an organization may host a series of remote interviews. When sending out invitations for participants (interviewers and interviewees), the server 102 automatically designates the organization as the default role, allowing it to seamlessly oversee and manage the meeting logistics.

The server 102 is further configured to control information flow selectively among the plurality of user devices 114 of the plurality of participants such that the one or more first type of user devices 118 associated with the first type of participant IDs are alerted of a list of anti-proctoring applications being operational at the one or more second type of user devices 120 associated with the second type of participant IDs during the online meeting. In some implementations, the server 102 controls information flow among the plurality of user devices 114 to enhance the integrity of the online meeting. By selectively alerting the first type of user devices 118 (associated with interviewers) of the operational anti-proctoring applications on the second type of user devices 120 (associated with interviewees), the system 100 aims to ensure fair and secure assessments. This proactive alert system helps interviewers be aware of any potential unauthorized tools or applications in use, fostering a controlled environment for assessments. The selective control and alert mechanism contribute to preventing any inadvertent or intentional breaches of assessment security, ultimately enhancing the overall reliability of the remote interview and assessment process.

In some implementations, the proctoring server 102 is further configured to lock the information flow from the one or more first type of user devices 118 to the one or more second type of user devices 120 with respect to monitoring the predefined list of anti-proctoring applications that corresponds to one or more of: a multimedia-sharing application, a remote access application, a web browser, or other collaborative applications. In other words, the proctoring server 102 is further configured to maintain a unidirectional information flow from the one or more interviewees to the one or more interviewers during the online meeting. The unidirectional information flow includes the list of unauthorized tools or anti-proctoring applications in use in real-time or near real-time. In some implementations, the list of anti-proctoring applications includes one or more of: a multimedia-sharing application, a generative artificial intelligence (AI) based application, a remote access and collaboration application, a remote desktop application, a web browser, a browsing anonymity tool, a screen mirroring application, a keyboard or mouse control simulator application, a camera blocker, a microphone blocker, a virtual private network (VPN) application, or other collaborative applications.

In some implementations, the proctoring server 102 is further configured to periodically acquire anti-proctoring information from a set of pre-installed applications associated with the online meeting from the one or more second type of user devices 120 associated with the identified one or more interviewees. This process is essential for staying ahead of potential threats or breaches during the online meeting. By regularly obtaining information about the anti-proctoring applications 112 installed on the interviewees' devices, the system 100 may adapt and update its database of prohibited tools, ensuring comprehensive coverage. This proactive approach enhances ability of the system 100 to detect and prevent the use of unauthorized applications, contributing to a more robust and secure remote interview and assessment environment. For example, the proctoring server 102 receives info of an online application such as Zoom, Google Meet, or any other screen-sharing applications running at the interviewee's end.

The proctoring server 102 is further configured to validate if the anti-proctoring information includes one or more valid anti-proctoring applications based on the predefined database 108 of the anti-proctoring applications 112 stored in the proctoring server 102. Specifically, the proctoring server 102 validates the anti-proctoring information by checking if the identified anti-proctoring applications on the second type of user devices 120 are valid and match the entries in the predefined database 108 of the anti-proctoring applications 112 stored within the proctoring server 102.

In some implementations, the anti-proctoring information includes attendee details along with the list of the anti-proctoring applications 112 running at the one or more second type of user devices 120 associated with the second type of participant IDs during the online meeting. The attendee details include two or more of: an attendee name, an attendee organization, an attendee city, an attendee country, and an attendee time zone. However, in some examples, the attendees' details may include VPN information, coordinates, and the like.

In some implementations, the proctoring server is further configured to cause the one or more second type of user devices 120 associated with the second type of participant IDs to communicate the corresponding list of the anti-proctoring applications 112 running at each of the one or more second type of user devices 120 in a real-time or near real-time to the one or more first type of user devices 118 during an ongoing session of the online meeting. The proctoring server 102 triggers the second type of user devices 120, associated with the identified one or more interviewees, to promptly communicate real-time or near real-time updates on the list of anti-proctoring applications 112 in operation during the ongoing online meeting. This real-time communication ensures that the first type of user devices 118, corresponding to the identified one or more interviewers, receive instantaneous alerts, empowering them to take swift and informed actions in response to any unauthorized applications detected. This proactive measure enhances the system's ability to prevent and address potential breaches promptly, contributing to the overall efficacy of the remote proctoring process.

In some implementations, the alert of the list of anti-proctoring applications being operational at the one or more second type of user devices 120 associated with the second type of participant IDs during the online meeting is a silent alert. The silent alert refers to a notification mechanism that discreetly informs the first type of user devices 118 (associated with the first type of participant IDs) about the operational anti-proctoring applications on the second type of user devices 120 (associated with the second type of participant IDs) without causing any visible or audible disruptions during the online meeting. The purpose of the silent alert is to maintain a non-intrusive and seamless assessment environment, ensuring that the monitoring process remains discreet and may not interfere with the natural flow of the interview or assessment. This way, the identified one or more interviewers may be informed of any potential breaches without causing unnecessary distraction or discomfort to participants. The proctoring server 102 is further configured to discreetly embed the list of anti-proctoring applications 112 under the UI element of each UI rendered at the one or more first type of user devices 118 for the silent alert. The list of anti-proctoring applications 112 is made visible only when the UI element is interacted to populate a user-wise list of anti-proctoring applications 112 running on each of the one or more second type of user devices 120. In other words, the list of anti-proctoring applications 112 remains hidden from immediate view and is only revealed when the UI element is interacted with. When an interaction occurs with the UI element, such as a click or touch, the user-wise list of anti-proctoring applications 112 running on each of the one or more second type of user devices 120 is revealed. This ensures that the alert is presented to the interviewers only when they choose to access the information, maintaining a balance between transparency and non-intrusiveness during the assessment process. The user-wise list refers to a specific compilation or enumeration of the anti-proctoring applications 112 associated with individual users participating in the online meeting.

In some implementations, the proctoring server 102 is further configured to remotely proctor a surrounding environment of the one or more interviewees from among the plurality of participants of the online meeting based on a 360-degree video obtained from the one or more second type of user devices 120. In such implementations, the proctoring server 102 captures a comprehensive view of the interviewee's environment through the 360-degree video. The 360-degree video refers to a video recording that captures a panoramic view of the surroundings in all directions-horizontally and vertically. Unlike traditional videos that offer a fixed perspective, the 360-degree video enables viewers to explore the entire environment, either by using interactive controls to navigate within the video or by wearing virtual reality (VR) headsets for a more immersive experience. This functionality is implemented to ensure a more thorough and holistic proctoring process. The 360-degree video allows the proctoring system 100 to observe the entire surroundings, minimizing blind spots and enhancing the ability to detect any unauthorized activities or external assistance. The 360-degree video feed is obtained in real-time or near real-time from the cameras or sensors of the one or more second type of user devices 120. The proctoring server 102 remotely analyses the 360-degree video to proctor the interviewee's surroundings effectively during the online meeting.

In some implementations, the proctoring server 102 is further configured to track a location of the one or more second type of user devices 120, a scheduled meeting time, and a duration of the online meeting. The selective control of the information flow among the plurality of user devices 114 of the plurality of participants is based on the tracking of the location of the one or more second type of user devices 120, the scheduled meeting time and the time duration of the online meeting. Firstly, by employing technologies such as GPS, the system 100 ensures a secure testing environment by verifying that the identified one or more interviewees are physically present in predetermined locations. This minimizes the possibility of external assistance or unauthorized activities during assessments. Secondly, the proctoring server 102 utilizes the information about the scheduled meeting time and its duration to implement context-specific controls over the flow of information. During critical assessment periods, stricter controls are enforced, aligning with the designated testing timeframe. Such tracking mechanisms not only bolster the overall security of the online meeting but also enable dynamic and responsive measures to uphold the integrity of the assessment process.

The disclosed system 100 for remote interview and assessment proctoring introduces a paradigm shift in ensuring the security, fairness, and integrity of virtual evaluation processes. By seamlessly identifying interviewers and interviewees, generating distinct meeting links, and selectively controlling information flow among participants, the system 100 establishes an advanced level of control and accountability. The silent alerts regarding anti-proctoring applications operational on interviewees' devices provide real-time insights, empowering interviewers to address potential issues promptly. Moreover, the inclusion of location tracking, scheduled meeting time, and duration-based controls offers a comprehensive approach, thwarting unauthorized activities and ensuring a trustworthy assessment environment. This innovation amalgamates cutting-edge technologies to create a robust and adaptable solution, addressing the shortcomings of existing remote proctoring systems and setting a new standard for secure online assessments.

Figure 2:
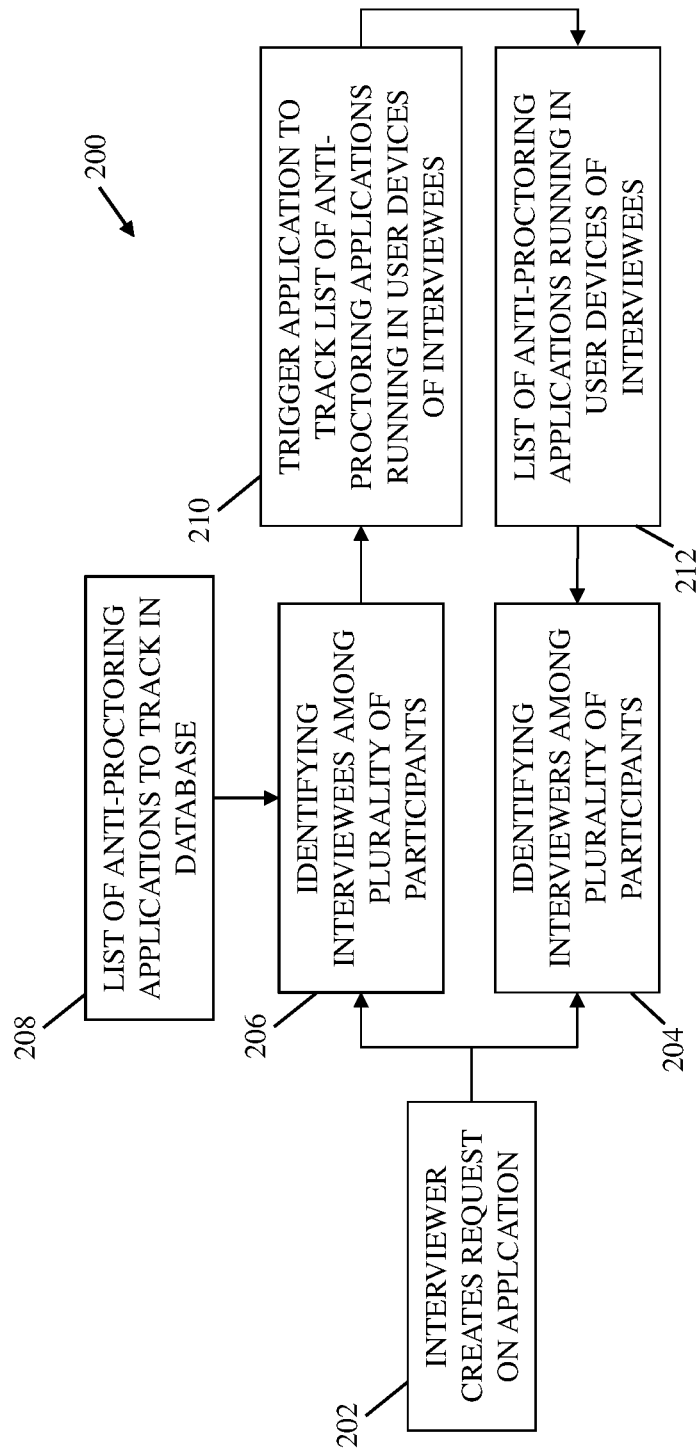
FIG. 2 is a flowchart depicting operations for remote interview and assessment proctoring, in accordance with an embodiment of the present disclosure.

FIG. 2 is a flowchart depicting operations for remote interview and assessment proctoring, in accordance with an embodiment of the present disclosure. FIG. 2 is described in conjunction with elements from FIG. 1. With reference to FIG. 2, there is shown a flowchart 200 that includes a series of operations from 202 to 212. The processor 104 of the proctoring server 102 (of FIG. 1) is configured to execute the flowchart 200.

At operation 202, the processor 104 is configured to generate a request on an application associated with the system 100 to initiate an online meeting upon receiving the user input from one of the interviewers. The application is rendered on the user interface of the first user device 116 and is run by the proctoring server 102. During the request creation, the interviewer may be required to input relevant details. This may include information such as the type of interview or assessment, the identity of the interviewer, and any specific settings or preferences for the session. Further, at operation 204, the processor 104 is further configured to identify the one or more interviewers among the plurality of participants based on the role type parameter received from the first user device 116 from which the online meeting is initiated. Similarly, at operation 206, the processor 104 is further configured to identify the one or more interviewers among the plurality of participants based on the role type parameter received from the first user device 116. After that, at operation 208, the processor 104 is further configured to generate the predefined database 108, including the list of the anti-proctoring applications 112 to track in the second type of user devices 120 associated with the interviewees. Then, at operation 210, the processor 104 is further configured to trigger the application to track a list of the anti-proctoring applications 112 running in the second type of user devices 120 associated with the interviewees. Lastly, at operation 212, the processor 104 is further configured to control information flow selectively among the plurality of user devices 114 of the plurality of participants such that the one or more first type of user devices 118 associated with the one or more interviewers identified at operation 206 are alerted of the list of anti-proctoring applications 112 being operational at the one or more second type of user devices 120 associated with the one or more interviewees identified at operation 204 during the online meeting.

Figure 3:
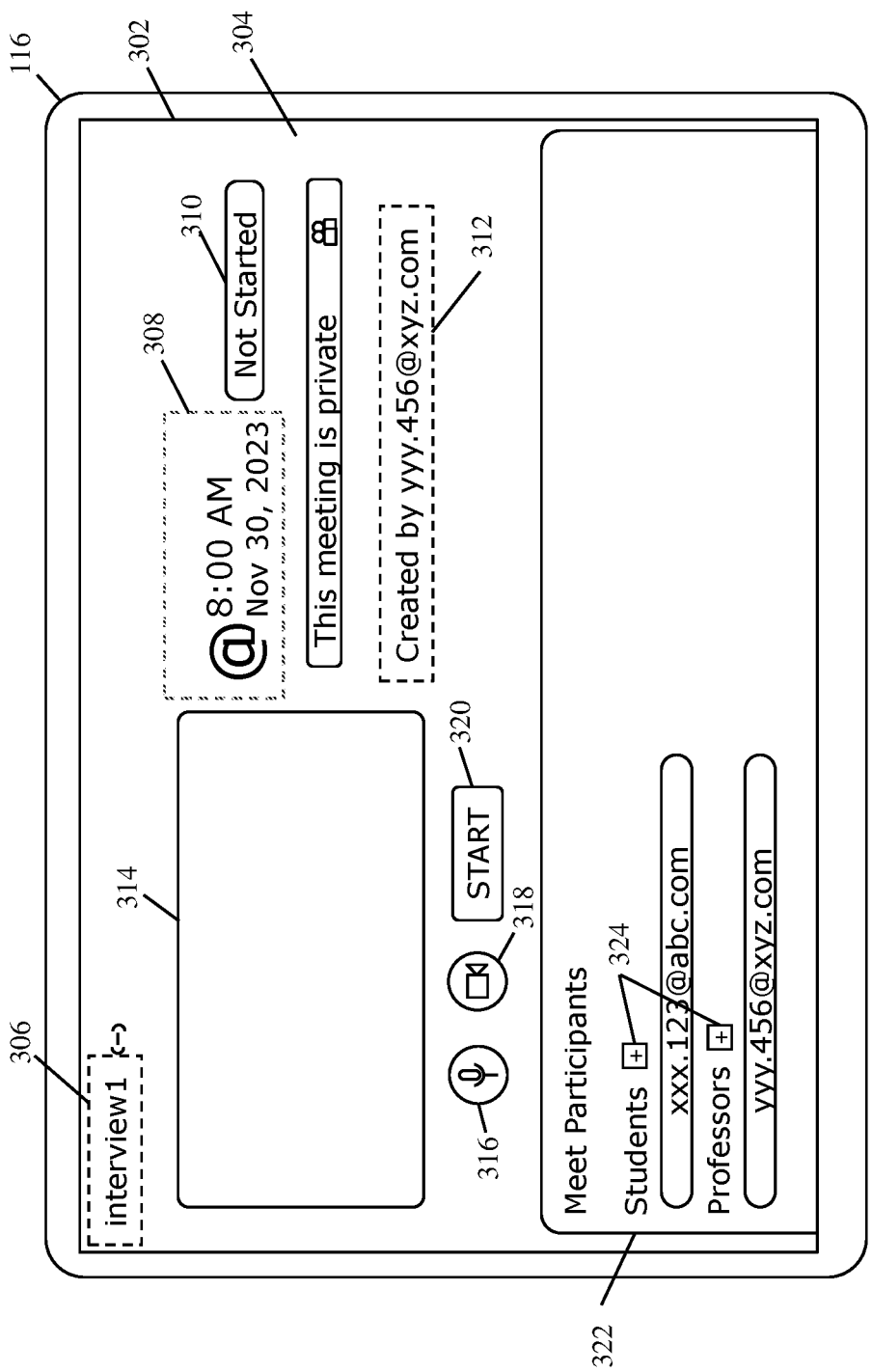
FIG. 3 is a schematic diagram of a first user device, in accordance with an embodiment of the present disclosure.

FIG. 3 is a schematic diagram of a first user device, in accordance with an embodiment of the present disclosure. FIG. 3 is described in conjunction with elements from FIGS. 1 and 2. With reference to FIG. 3, there is shown a schematic diagram of the first user device 116 from which the online meeting is initiated. The first user device 116 includes a user interface 302 rendered over a display 304 of the first user device 116. The user interface 302 shows an initial meeting page that represents details related to the online meeting, such as a title of the online meeting, as shown in a dashed block 306, a time of the interview, as shown in a dashed block 308, an interview status 310, a creator of the online meeting, as shown in a dashed block 312. Further, the initial meeting page includes a video feed output 314 from at least one camera of the first user device 116, a mute/unmute button 316, a video feed ON/OFF button 318, and a start button 320 that initiates the online meeting. The initial meeting page further includes a section 322 that shows e-mail identities (ID) of the plurality of participants. In the section 322, a first role type data field to invite the one or more interviewers and a second role type data field to invite the one or more interviewees for the online meeting are shown. Further, the plurality of participants is listed based on the role type parameter in the respective role type data field. In addition, the user of the first user device 116 can add the plurality of participants into the first role type data field and the second role type data field by entering their e-mail ID in the respective role type data field. For example, in the illustrated embodiment of FIG. 3, in the section 322, there is a first role type data field, i.e., students and a second role type data field, i.e., professors. In such example, the user may click on a corresponding add symbol 324 adjacent to a respective role type data field to add the plurality of participants based on their role type parameters. In some other examples, a customized configuration may feature different role type data fields, such as "Team Members" and "Project Leads" in the section 322. The aforementioned flexible approach accommodates various online meeting scenarios where roles may be tailored to specific organizational structures, project teams, or any other relevant classification. The users may have the flexibility to define and customize role type data fields based on their specific requirements, enhancing the adaptability of the system 100 (of FIG. 1) to diverse collaboration environments.

Figure 4:
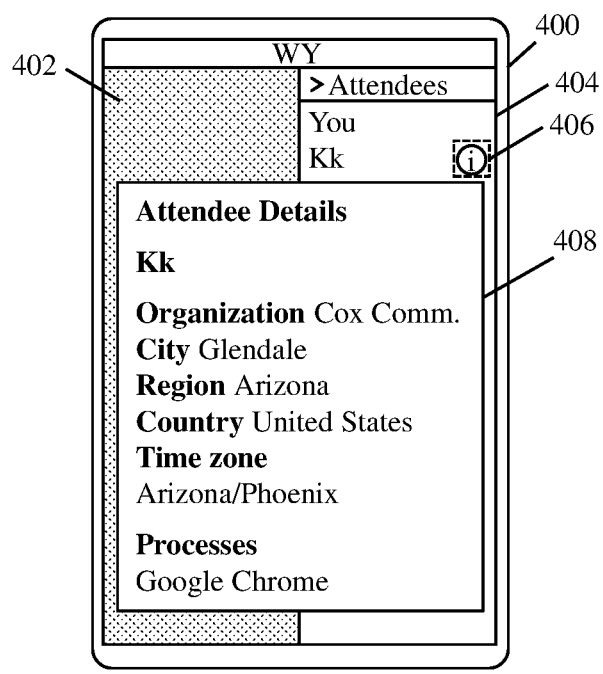
FIG. 4 is a schematic diagram of a first type of user device, in accordance with an embodiment of the present disclosure.

FIG. 4 is a schematic diagram of a first type of user devices, in accordance with an embodiment of the present disclosure. FIG. 4 is described in conjunction with elements from FIGS. 1, 2 and 3. With reference to FIG. 4, there is shown a schematic diagram of a first type of user device 400 (i.e., one of the first type of user devices 118) that is associated with the identified one or more interviewers. The user device 400 includes a user interface 402 rendered over a display 404 of the first user device 116. The user interface 402 includes a UI element 406 for each participant. In the illustrated embodiment of FIG. 4, the UI element 406 is an information icon. However, in some other embodiments, the UI element 406 may include a different symbol. When the UI element 406 is interacted with, such as clicked or hovered, a pop-up 408 is displayed. The pop-up 408 includes the attendee details and the anti-proctoring information related to the respective attendee. The attendee details include two or more of: an attendee name, an attendee organization, an attendee city, an attendee country, and an attendee time zone. The anti-proctoring information includes the list of anti-proctoring applications running on the attendee's user device.

Figure 5:
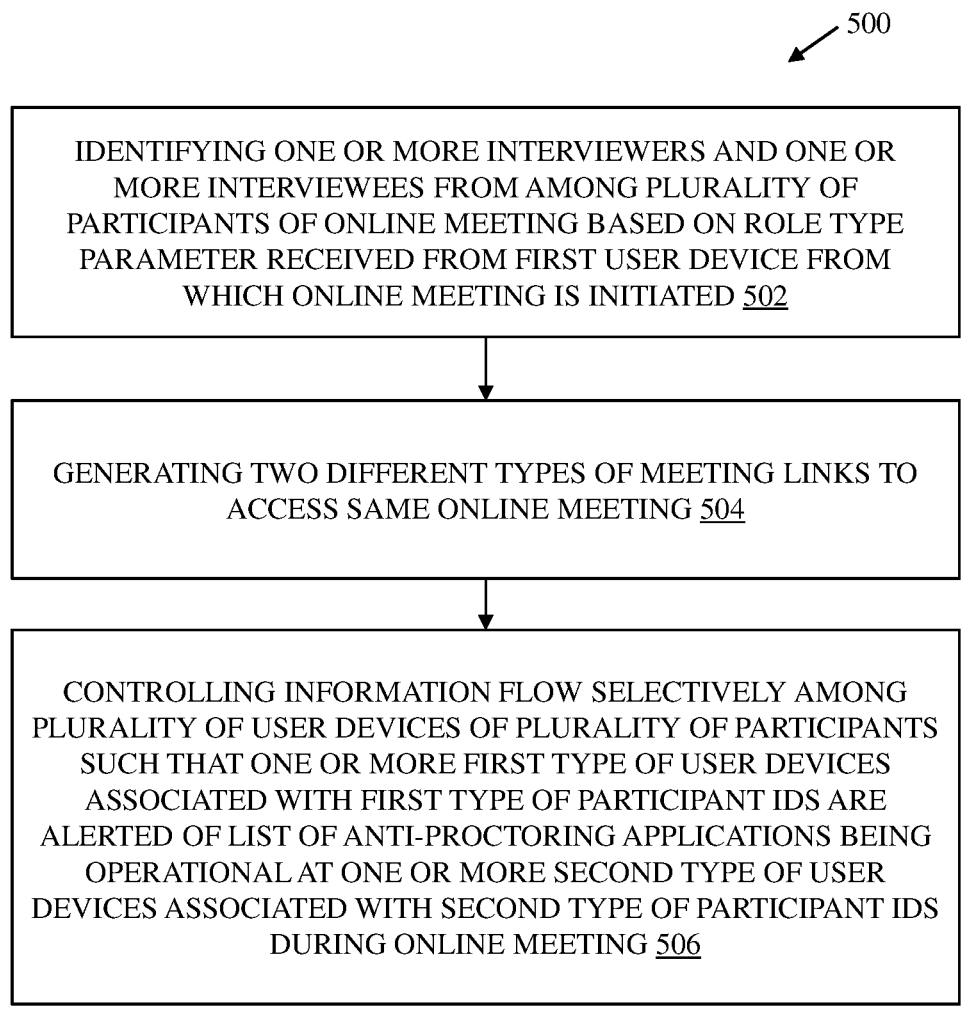
FIG. 5 is a flowchart of a method for remote interview and assessment proctoring, in accordance with an embodiment of the present disclosure.

FIG. 5 is a flowchart depicting a method for live remote interview and assessment proctoring, in accordance with an embodiment of the present disclosure. With reference to FIG. 5, there is shown a flowchart of a method 500 for live remote interview and assessment proctoring. The method 500 includes steps 502 to 506.

There is provided the method 500 for live remote interview and assessment proctoring in a proctoring server (i.e., the proctoring server 102 of FIG. 1). The method 500 is used to identify interviewers and interviewees within an online meeting, create distinct meeting links for them, and manage the flow of information among participant devices. Specifically, the method 500 is used to differentiate between the one or more interviewers and the one or more interviewees based on their roles in the meeting's initiation device, i.e., the first user device 116. The method 500 is used to further generate two types of meeting links, each offering exclusive access to different participant identities: one for the one or more interviewers and another for the one or more interviewees. Additionally, the method 500 is used to exercise control over information flow among participant devices, enabling the identification and alerting of the anti-proctoring applications 112 operating on the interviewee devices to the corresponding interviewer devices during the online meeting.

In operation, at step 502, the method 500 includes identifying one or more interviewers and one or more interviewees from among the plurality of participants of an online meeting based on a role type parameter received from the first user device 116 from which the online meeting is initiated. Furthermore, at step 504, the method 500 further includes generating two different types of meeting links to access the same online meeting. Moreover, the first type of meeting link of the two different types of meeting links is configured to provide exclusive access to the first type of participant identities (IDs) associated with the identified one or more interviewers, and the second type of meeting link of the two different types of meeting links is configured to provide exclusive access to the second type of participant identities (IDs) associated with the identified one or more interviewees. Thereafter, at step 506, the method 500 further includes controlling information flow selectively among the plurality of user devices 114 of the plurality of participants such that one or more first type of user devices 118 associated with the first type of participant IDs are alerted of the list of anti-proctoring applications being operational at the one or more second type of user devices 120 associated with the second type of participant IDs during the online meeting.

The method 500 for live remote interview and assessment proctoring enhances the reliability and security of online evaluations. Firstly, the precise identification of interviewers and interviewees based on role type parameters ensures an organized and role-specific interaction within the online meeting. This contributes to a streamlined and controlled assessment process. The generation of two different types of meeting links with exclusive access for the one or more interviewers and the one or more interviewees enhances the security and privacy of participant identities. The generation of meeting links establishes a segregated access system, preventing unauthorized entry and ensuring that each participant accesses the online meeting based on their designated role. Furthermore, the selective control of information flow, coupled with real-time alerts to interviewers about the operational status of anti-proctoring applications on the interviewees' devices, provides a proactive approach to monitoring and addressing potential breaches. This feature empowers interviewers to maintain the integrity of the assessment by taking timely actions against any unauthorized applications, fostering a secure and trustworthy remote evaluation environment. In summary, the method 500 encompasses precise participant identification, enhanced security through exclusive meeting links, and proactive monitoring of anti-proctoring applications, collectively contributing to a robust and trustworthy live remote interview and assessment proctoring.

Modifications to embodiments of the present disclosure described in the foregoing are possible without departing from the scope of the present disclosure as defined by the accompanying claims. Expressions such as "including", "comprising", "incorporating", "have", "is" used to describe, and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

What is claimed is:

1. A system for remote interview and assessment proctoring, the system comprising:
    a proctoring server configured to:
        identify one or more interviewers and one or more interviewees from among a plurality of participants of an online meeting based on a role type parameter received from a first user device from which the online meeting is initiated;
        generate two different types of meeting links to access the same online meeting,
        wherein a first type of meeting link of the two different types of meeting links is configured to provide exclusive access to a first type of participant identities (IDs) associated with the identified one or more interviewers, and
        wherein a second type of meeting link of the two different types of meeting links is configured to provide exclusive access to a second type of participant identities (IDs) associated with the identified one or more interviewees; and
        control information flow selectively among a plurality of user devices of the plurality of participants such that one or more first type of user devices associated with the first type of participant IDs are alerted of a list of anti-proctoring applications being operational at one or more second type of user devices associated with the second type of participant IDs during the online meeting.

2. The system of claim 1, wherein the list of anti-proctoring applications comprises one or more of: a multimedia-sharing application, a generative artificial intelligence (AI) based application, a remote access and collaboration application, a remote desktop application, a web browser, a browsing anonymity tool, a screen mirroring application, a keyboard or mouse control simulator application, a camera blocker, a microphone blocker, a virtual private network application, or other collaborative applications.

3. The system of claim 1, wherein the proctoring server is further configured to periodically acquire anti-proctoring information from a set of pre-installed applications associated with the online meeting from the one or more second type of user devices associated with the identified one or more interviewees.

4. The system of claim 3, wherein the proctoring server is further configured to validate if the anti-proctoring information comprises one or more valid anti-proctoring applications based on a predefined database of anti-proctoring applications stored in the proctoring server.

5. The system of claim 3, wherein the anti-proctoring information comprises attendee details along with the list of anti-proctoring applications running at the one or more second type of user devices associated with the second type of participant IDs during the online meeting, wherein the attendee details comprise two or more of: an attendee name, an attendee organization, an attendee city, an attendee country, and an attendee time zone.

6. The system of claim 1, wherein the proctoring server is further configured to cause the one or more second type of user devices associated with the second type of participant IDs to communicate a corresponding list of anti-proctoring applications running at each of the one or more second type of user devices in a real time or near real time to the one or more first type of user devices during an ongoing session of the online meeting.

7. The system of claim 1, wherein the alert of the list of anti-proctoring applications being operational at one or more second type of user devices associated with the second type of participant IDs during the online meeting is a silent alert.

8. The system of claim 7, wherein the proctoring server is further configured to discreetly embed the list of anti-proctoring applications under a user interface (UI) element of each UI rendered at the one or more first type of user devices for the silent alert,
    wherein the list of anti-proctoring applications is made visible only when the UI element is interacted, to populate a user-wise list of anti-proctoring applications running on each of the one or more second type of user devices.

9. The system of claim 1, wherein the proctoring server is further configured to remotely proctor a surrounding environment of the one or more interviewees from among the plurality of participants of the online meeting based on a 360-degree video obtained from the one or more second type of user devices.

10. The system of claim 1, wherein the proctoring server is further configured to track a location of the one or more second type of user devices, a scheduled meeting time, and a time duration of the online meeting, wherein the selective control of the information flow among the plurality of user devices of the plurality of participants is based on the tracking of the location of the one or more second type of user devices, the scheduled meeting time and the time duration of the online meeting.

11. A method for live remote interview and assessment proctoring, the method comprising:

in a proctoring server:

identifying one or more interviewers and one or more interviewees from among a plurality of participants of an online meeting based on a role type parameter received from a first user device from which the online meeting is initiated;

generating two different types of meeting links to access the same online meeting, wherein a first type of meeting link of the two different types of meeting links is configured to provide exclusive access to a first type of participant identities (IDs) associated with the identified one or more interviewers, and wherein a second type of meeting link of the two different types of meeting links is configured to provide exclusive access to a second type of participant identities (IDs) associated with the identified one or more interviewees; and controlling information flow selectively among a plurality of user devices of the plurality of participants such that one or more first type of user devices associated with the first type of participant IDs are alerted of a list of anti-proctoring applications being operational at one or more second type of user devices associated with the second type of participant IDs during the online meeting.

* * * * *